United States Patent [19]

Cole et al.

[11] 4,364,043

[45] Dec. 14, 1982

[54] EFFICIENT OBJECT IDENTIFICATION SYSTEM

[75] Inventors: Peter H. Cole, West Lake Shore; Kamran Eshraghian, Hectorville; Ashim K. Roy, Athelstone, all of Australia

[73] Assignee: The University of Adelaide, North Terrace, Australia

[21] Appl. No.: 299,887

[22] Filed: Sep. 8, 1981

Related U.S. Application Data

[63] Continuation-in-part of Ser. No. 43,634, May 30, 1979, abandoned.

[51] Int. Cl.³ .............................................. H04Q 9/00
[52] U.S. Cl. .............................. 340/825.54; 340/38 L; 343/6.8 R
[58] Field of Search ................. 340/825.54, 825.55, 340/38 L; 343/6.5 SS, 6.8 R

[56] References Cited

U.S. PATENT DOCUMENTS

| | | | |
|---|---|---|---|
| 3,290,675 | 12/1966 | Neild | 178/43 |
| 3,859,624 | 1/1975 | Kriofsky et al. | 340/38 L |
| 3,944,928 | 3/1976 | Augenblick et al. | 343/6.8 R |
| 3,964,024 | 6/1976 | Hutton et al. | 340/38 L |
| 4,040,053 | 8/1977 | Olsson | 343/6.5 SS |
| 4,114,151 | 9/1978 | Denne et al. | 343/6.8 R |
| 4,129,855 | 12/1978 | Rodrian | 343/6.8 R |
| 4,196,418 | 4/1980 | Kip et al. | 343/6.5 SS |
| 4,314,373 | 2/1982 | Sellers | 343/6.5 SS |

*Primary Examiner*—Donald J. Yusko
*Attorney, Agent, or Firm*—Oldham, Oldham, Hudak & Weber Co.

[57] ABSTRACT

A system for the remote identification of objects using near-field electromagnetic coupling between an interrogator a transponder and a receiver in which a reply carrier at a subharmonic of the interrogation frequency is obtained by regulating, with minimum energy loss and synchronously with the interrogator signal, the energy exchange process between the transponder coupling element and a complementary storage element, and further varying, also with minimum energy loss and synchronously with the resultant oscillation waveform, the said energy exchange process so that the reply carrier becomes modulated with an information bearing code, the modulation rate being not constrained by the transponder tuned circuit bandwidth.

20 Claims, 24 Drawing Figures

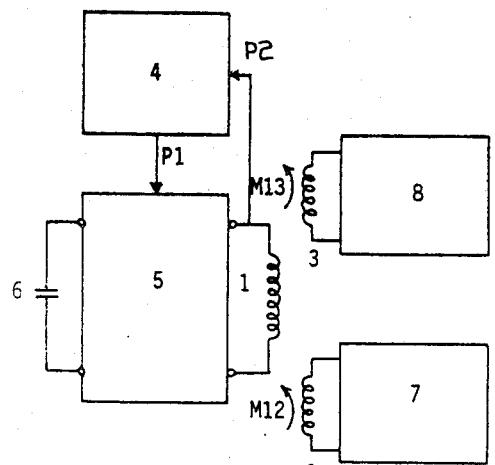
FIGURE 1.
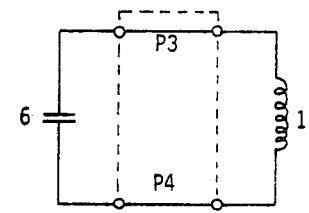
FIGURE 2.
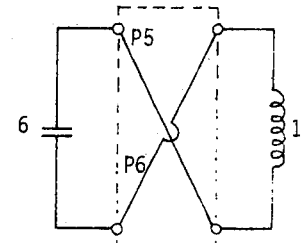
FIGURE 3.
| FREQUENCY COLUMN | SWITCHING CYCLE | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| f | + | + | PATTERN REPEATS CYCLICALLY | | | | | | | | | | | |
| ½f | + | 0 | 0 | + | PATTERN REPEATS CYCLICALLY | | | | | | | | | |
| ⅓f | + | 0 | − | − | 0 | + | PATTERN REPEATS CYCLICALLY | | | | | | | |
| ¼f | + | 0 | − | 0 | 0 | − | 0 | + | PATTERN REPEATS CYCLICALLY | | | | | |
| ⅕f | + | 0 | − | 0 | + | + | 0 | − | 0 | + | PATTERN REPEATS C. | | | |
| ⅙f | + | 0 | − | 0 | + | 0 | 0 | + | 0 | − | 0 | + | P.R.C. | |
FIGURE 4.

SWITCHING SEQUENCE FOR WAVEFORMS OF FIGURE 13

| TIME PERIOD | INDUCTOR CONNECTION AND POLARITY | | | |
|---|---|---|---|---|
| | 1-1 | | 1-2 | |
| | CAPACITOR | POLARITY | CAPACITOR | POLARITY |
| 1 | 6-1 | + | - | |
| 2 | - | | 6-2 | + |
| 3 | - | | - | |
| 4 | 6-3 | + | - | |
| 5 | - | | 6-1 | - |
| 6 | - | | - | |
| 7 | 6-2 | + | - | |
| 8 | - | | 6-3 | - |
| 9 | - | | - | |
| 10 | 6-1 | - | - | |
| 11 | - | | 6-2 | - |
| 12 | - | | - | |
| 13 | 6-3 | - | - | |
| 14 | - | | 6-1 | + |
| 15 | - | | - | |
| 16 | 6-2 | - | - | |
| 17 | - | | 6-3 | + |
| 18 | - | | - | |

FIGURE 14.

EFFICIENT OBJECT IDENTIFICATION SYSTEM

CROSS-REFERENCE

This application is a continuation-in-part of our earlier filed and copending application bearing Ser. No. 043,634, filed May 30, 1979, and now abandoned, bearing the title "Efficient Object Identification System."

FIELD OF THE INVENTION

The present invention relates to object identification systems wherein a transmitting means called the interrogator is coupled to an identification means called the transponder which is attached to or associated with the object to be identified, and which generates a reply signal which is coupled to a receiving means from which useful information about the object is extracted.

THE PRIOR ART

In one known system microwave signals are used, the transponder extracting power from the interrogator at one frequency and subsequently reradiating power at another frequency, the reradiated signal being detected and used as the identification means. See "RAYTAG", An Electronic Remote Data Readout System by Nathan Freedman, Raytheon Company, Wayland Laboratories, Mass. 01778. Presented at Carnham Conference on Electronic Crime Countermeasures, Proc. April 1973.

In another microwave system a passive label having a number of dipoles arranged in accordance with a code is attached to the object which is illuminated by a source radiating microwave energy. As the object moves across the microwave beam each dipole produces a frequency modulated pulse. Successive dipoles produce time displaced frequency modulated signals. The sum of these signals is detected by the interrogation unit and resolved into a serial code identifying the object. See Identity Transponder System Using CW Interrogation. C. D. McEwen, Department of Electronic and Electrical Engineering, University College, London, U.K. Electronic letters, Dec. 11, 1975, Vol. 11, Nos 25/26, pp 642-643.

In another such one-port system, an interrogator illuminates a passing tag with microwave energy at one frequency. The tag radiates back a code modulated carrier at the second harmonic of the interrogation frequency. See An Electronic License Plate for Motor Vehicles, Fred Sterzer, RCA Laboratories, Princeton, N.J. 08540. RCA Review, Vol 35, June 1974, pp 167-175. Aso see A Microwave Automatic Identification System, R. J. Klensch, J. Rosen, and H. Staras, RCA Laboratories, Princeton, N.J. 08540. RCA Review, Vol 34, December 1973, pp 566-579. Also see Augenblick et al., U.S. Pat. No. 3,944,928.

In yet another microwave system the interrogation signal is modulated to produce a sub carrier and the coding is provided by switching the sub carrier on-off with a serial code. See Short-Range Radio Telemetry for Electronic Identification Using Modulated RF Backscatter, A. R. Koelle, S. W. Depp, and R. W. Freyman. Proceedings of IEEE, August 1975, pp 1260-1261.

The disadvantages associated with these microwave systems arise from difficulties in sufficiently confining the interrogation energy, statutory limits on levels of microwave power which can be used and in some cases clutter from extraneous objects, many of which can readily generate harmonic signals at the microwave frequencies and power levels used to interrogate the tags.

Another known system, of the kind to which the invention relates, uses acoustic surface wave delay lines for identification. This technique involves in the transponder a receiving antenna feeding a delay line, from which the output is either returned to a reply antenna (a two-port transponder), or returned to the original antenna (a one-port system), for radiation to the receiving means. In this system difficulties are encountered with the delay line length when long codes are required to be generated. Furthermore, because the reply signals from this type of transponder are weak, complex signal processing is necessary to extract the reply signal from noise. The acoustic surface wave system also has the disadvantage that, at the most suitable frequencies for its operation, unconfined radiation of high power signals is not permitted. See Passive Coded Transponder Using an Acoustic-Surface-Wave Delay line. D. E. N. Davies, M. J.Withers, R. P. Claydon, Electronics Letters, Apr. 17, 1975, Vol 11, No 8, pp 163-164.

In another group systems as described in British Pat. No. 1,187,130 By Plessey Limited, and U.S. Pat. No. by Thomas J. Hutton et al. 3,964,024, James A. Rodrian U.S. Pat. No. 4,129,855, Donald W. Neild U.S. Pat. No. 3,290,675, and Thomas A. Kriofsky et al. U.S. Pat. No. 3,859,624, the principle of inductive coupling is exploited for object identification. In these systems the transponder is a passive electronic device having two uncoupled antennas. When a signal is received from the interrogating source the received energy is converted to dc which is used firstly to operate control and code generation circuits within the transponder and secondly to provide a power source from which energy is taken to establish a reply signal oscillation in the reply antenna of the transponder. For transponder systems employing near-field coupling, the use on the transponder of separate antennas for reception and retransmission is a serious disadvantage, as the effectiveness of a near-field coupling element of a given material and shape can be shown to depend upon its volume. Operational considerations normally limit the maximum allowed size of a transponder and here the use of two separate antennas which compete for the available space will result in a reduction both in the strength of coupling of the interrogation signal into the transponder and of the reply signal back to the interrogation apparatus. A variation of the above technique could be designed to use a duplexer to eliminate the need for a second antenna; however the duplexer introduces further losses and imposes limitations on the bandwidth of the system. These systems have the further disadvantage that the energy available for generating the reply signal has been attenuated by the losses involved in conversion of the interrogation signal energy first to dc and then reconversion of this energy to the frequency of the reply signal. Moreover the forward voltage drop provided by commonly available semi-conductor diodes involved in conversion to dc places a lower limit on the threshold of operation.

The systems described above also have the disadvantage that the methods used to generate and to place an information carrying modulation upon the reply signal either, as for example in the Kriofsky transponder, such as to preclude the production of a reactive power in the reply coupling element much greater than the real power required to sustain the reply signal oscillation, or, as for example in the Plessey or Hutton and Kramer transponders, such as to place a limit, dependent upon the information rate desired in the reply signal, on the quality factor which may be employed in the resonant circuit involving the retransmitting coil, as the bandwidth of the retransmitting coil tuned circuit establishes the rate at which signals of one phase will be attenuated and signals of another phase will be built up when a transition between bits of the reply code takes place. The limitation is a significant one as the strength of the reply provided by the transponder depends upon the reactive power at the reply signal frequency within the retransmitting coil, and this reactive power can be shown to be the product of the retransmitting coil tuned circuit quality factor and the power available within the transponder to sustain the oscillation at the reply signal frequency.

In another group of systems, described in U.S. Pat. No. 3,299,424 by Jorgen P. Vinding and U.S. Pat. No. 4,196,418 by Harm J. Kip and Tallienco W. H. Fockens, the principle of near-field inductive coupling is again used for the transfer of energy to a tuned circuit which is normally resonant at the frequency of the interrogation signal. In these systems a reply signal is generated by the periodic detuning of that resonant circuit by control means contained within the transponder.

In both of these transponder either the times at which the circuit is detuned are unrelated to the waveforms of the currents and voltages present in the transponder coupling element or the time at which the circuit is retuned to the frequency of the interrogation signal is unrelated to the period of that interrogation signal. It may be shown as a result that to avoid decreasing the already weak reply signal from the transponder, the rate at which the system is detuned must be restricted to be of the order of or less than the bandwidth of the transponder tuned circuit, which must be kept as small as practicable in order to enhance the reply. One undesirable consequence of this restriction is that the reply signal information is transmitted in closely related sidebands of the interrogation signal and separation of the interrogation and reply signals in the receiver becomes a problem, and furthermore any disturbance to the interrogation antenna field by other objects moving in its vicinity will produce detuning and loading effects of that antenna which will tend to obscure the modulation effects introduced by the transponder. Another undesirable consequence of the restriction is that the rate of information transmission in the reply code is also limited to be of the order of or less than the bandwidth of the transponder tuned circuit, and long codes cannot then be transmitted from transponders which move through the detection field of the interrogation system in a short time.

Specific prior art specifications are British Pat. No. 1,187,130 by Plessey Limited, U.S. Pat. No. 3,964,024 by Hutton and Kramer, U.S. Pat. No. 3,859,624 by Kriofsky et al., U.S. Pat. No. 3,299,424 by Jorgen P. Vinding, and U.S. Pat. No. 4,196,418 by Kip and Fockens, which specifications have been referred to earlier in this specification.

OBJECTS OF THE INVENTION

An object of the present invention is to provide an improved system for object identification whereby the transformation from a first frequency to a second frequency of the reactive power flowing between a near-field coupling element of a transponder and the complementary energy storage element with which it is resonated can be effected with minimum energy loss, and in which modulation of the reply signal can be carried out without significant dissipation of energy, and at a rate which is not limited by the bandwidth of that resonant circuit.

A further object of the invention is to devise a system for object identification in which efficient generation of a reply signal at frequencies substantially removed from the interrogation frequency is possible.

A still further object is to avoid the need to convert the received power used for generation of the reply to dc and thereby to achieve efficient operation at low power level.

A still further object is to simplify the coupling elements used for the reception of energizing power and retransmission of the reply signal.

A still further object is to devise an object identification system providing a coded reply in which high quality tuned circuits can be exploited to enhance the transfer of power across the electromagnetic coupling links.

A still further object of the invention is to provide a means for implementing any one of the modulation methods such as Amplitude Shift Keying (ASK), Phase Shift Keying (PSK), Frequency Shift Keying (FSK) and Pulse Code Modulation (PCM) whereby the information bandwidth is not limited by the quality factor of the tuned circuit.

A still further object of the invention is to provide a control means whereby switching instants for the generation of the second frequency in accord with the achievement of the previously stated objects can be established.

Other objects will be apparent from the following description of the invention.

SUMMARY OF THE INVENTION

The present invention recognises that in passive code responding devices interrogated by electromagnetic means the reply signal from the transponding tag is very much weaker than the transmitted signal provided by interrogation system, and that this interrogation signal is normally strongly coupled to the receiver provided to detect the weak reply by virtue of the fact that both the transmitter and receiver antennas scan the same region of space. The sepration in the receiver system of the weak reply from the strong interrogation signal is a significant design problem, the solution of which is generally simplified if the reply signal can be made to occur in a frequency band substantially removed from that of the interrogation signal. The invention further recognises that when the transponder coupling element is constrained by reason of its size in relation to the electromagnetic wave lenth at the operating frequency to be operating in the near-field region, it is the reactive i.e. energy storage fields surrounding the transponder which determine principally the strength of the interaction with both the transmitter and receiver of the interrogation system. For a given transponder antenna there is normally a fixed relation between the strength of the near-field and the reactive power flowing in the transponder antenna. Making use of this fact and the well-known relation between real power, reactive power and resonance quality factor in a tuned circuit, it is possible to show that the appropriate objective to be pursued in the design of transponders using near-field coupling is the maximisation of the reactive powers flowing in the transponder coupling element at both the interrogation and reply signal frequencies. This invention provdes these reactive power components in a uniquely efficient way, firstly by modifying the resonance process between the transponder coupling element and its complementary energy storage element so that the same stored energy is used to provide the reactive power at both the interrogation and reply frequencies, secondly by ensuring that the modification of the resonance process is always such as to preserve as far as possible that stored energy, and thirdly by ensuring that the modified resonance process always remains phase coherent with the interrogation signal, so that no unnecessary reduction of the energy transfer from the interrogator to the transponder results.

The system according to the present invention requires in the transponder at least one coupling element used simultaneously for extraction of power from the transmitting source at one frequency and for the establishment of a reply signal field at another and related frequency. The energy which supports the reply signal oscillation is not as in the prior art injected into the coupling element from a battery or dc supply obtained by rectification of the voltage induced in the coupling element tuned circuit at the interrogation frequency, but is instead the same energy as supports the oscillation in the transponder tuned circuit at the interrogation frequency. The reply signal is generated therefrom by switches and control elements which operate at instances of time which are in every case controlled both in relation to the waveforms in the transponder tuned circuit and in relation to the period of the interrogation frequency to ensure that losses to the energy stored in the tuned circuit elements are minimised, and that in each complete cycle of the resulting oscillation the coupling element or voltage wave form contains components at both the interrogation and reply signal frequencies, the interrogation frequency components in all such cycles being coherent in phase. With the switching controlled in this way it becomes possible to generate, in transponder tuned circuits of high quality factor, reactive powers at subharmonics of the interrogation frequency which are comparable with the reactive power at the interrogation frequency itself, notwithstanding the fact that these subharmonic frequencies are different from the interrogation frequency by many times the bandwidth of the transponder tuned circuit, and furthermore it becomes possible to fully modulate the reply signal carrier frequency so generated at an information rate which is many times the bandwidth of that tuned circuit.

Thus the invention comprises an object identification system in which energy is transformed from a transmitter to a transponder by near-field coupling either inductive or capacitive to establish an oscillation in a tuned circuit of high quality factor, and in which at instants of time controlled as explained above the connections between the reactive energy storage elements are periodically altered so that the resulting oscillation contains simultaneously frequency components of the interrogation frequency and at least subharmonics thereof, whereby a receiver tuned to at least a subharmonic detects the reply so generated, and in which the switching pttern is varied so that the power transfer from the interrogation system to the transponder continues while the reply signal becomes modulated with an information bearing code.

An important characteristic of our invention is that that part of the energy which provides the reply signal reactive power is not derived by first converting a corresponding amount of energy to dc, although some smaller conversion of received power to dc for operation of the control circuits may be effected. In our invention, the reply signal reactive power is obtained by regulating directly the energy exchange processes between a transponder coupling element and a complementary energy storage element used to tune the coupling elment to resonance to enhance the near-field power transfer between the transmitter and transponder device. The invention therefore avoids significant losses, arising from the forward voltage drop of available semiconductor diodes, which would be involved if both the control power and the rep.y power were first converted to dc.

Another important characteristic of our invention is that the regulation of the energy exchange process between the transponder coupling element and the complementary energy storage element is effected using switching means and instants of time which allow the generation of strong reply signals at predictable frequencies which are nevertheless substantially removed from the interrogation frequency and which may be modulated at rates which are not restricted by the desirably small transponder tuned circuit bandwidth. The wide separation between the interrogation and reply frequencies allows highly effective filtering of the interrogation energy from the receiver system, and also renders the object identification system substantially immune from the effects of extraneous objects moving within the interrogation field. The removal of restrictions relating reply signal strength and reply code information rate possessed by prior art transponders allows long codes to be effectively recovered from transponders which spend only a short time in the interrogation field.

A further important characteristic of our invention is that if desired a single coupling element can be used for both the reception of power and retransmission of the reply. As it is often the case that the transponder coupling elements occupy almost all of the available transponder volume, this characteristic is of benefit in systems where operational considerations have restricted the maximum size of the transponder.

In the examples to be given the coupling element will be generally shown to be an inductor and its complementary energy storage element a capacitor. It will be evident however that the principles of the invention are equally applicable to the alternative situation in which the coupling is provided by capacitive means and the complementary storage element is an inductor. It will also be evident that the principles of the invention are applicable to the case where the coupling between the interrogation system and the transponder is provided by a combination of inductive and capacitive means, and complementary energy storage elements are used to provide energy exchange with each of the coupling elements.

In the examples to be given the receiver system is generally assumed to be tuned to the lowest subharmonic of the interrogation waveform generated by the switching operations. It will be clear however from an examination of the waveforms of coupling element current and voltage shown later for particular embodiments that substantial amplitudes of reactive power are simultaneously generated at other frequencies. Among these frequencies are both proper and improper fractions of the interrogation frequency which are, like the basic subharmonic, both predictable and well spaced from the interrogation frequency and its harmonics. It will be evident that the principles of the invention are equally applicable to the case when a receiver system is tuned to receive one or more of these frequencies in place of or in addition to the basic subharmonic.

BRIEF DESCRIPTION OF DRAWINGS

FIG. 1 shows diagrammatically the basic elements of the invention, namely the transponder and the associated interrogator consisting of a transmitter and receiver, showing the mutual coupling between the transponder coupling element and the transmitter and receiver coupling elements, FIGS. 2 and 3 show respectively how the transponder coupling element can be connected across the resonating complementary storage element either directly or in crossed coupling, FIG. 4 is a table showing the switching cycle which can be used to obtain a number of different subharmonics from a given transmitted signal, the patterns shown repeating cyclically, FIGS. 11, 12, 13 and 14 show respectively one particular array, a method of switching the array, one possible cyclic energy exchange process waveform, and a table showing the sequence of connections required to produce the indicated waveform.

DESCRIPTION OF PREFERRED EMBODIMENTS

Figure 5:
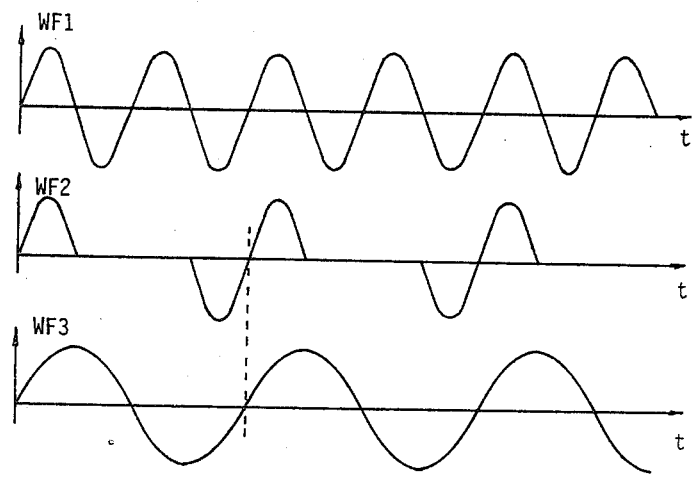
FIGS. 5, 6 and 7 show the waveforms achieved by some selected switching.

The essential characteristics of the invention can be better appreciated by reference to FIG. 1 in which the energy at a frequency $f_t$, for example 100 kHz, from transmitter 7 is fed to the transmitter coupling element 2 and is received at the transponder coupling element 1 by means of mutual coupling M12, between the transponder element 1 and transmitter element 2. Coupling also exists between the transponder element 1 and the coupling element 3 of the receiver 8, the transmitter 7 and the receiver 8 forming the interrogator. The energy received by the transponder coupling element 1 is exchanged in an oscillatory manner with complementary energy storage element 6 through the switching network 5 operating under control circuit 4 which derives timing signals and possibly control power from the transponder element 1 via path P2 and operates the switching network via P1. The switching network 5 provides for either direct connection as shown in FIG. 2 or crossed connection as shown in FIG. 3 between the transponder coupling element 1 and resonating capacitor 6.

The switching network also provides for the application of short circuits independently across either of the inductor or capacitor, or for the application of open circuits indpendently in series with either the inductor or capacitor.

The control circuit provides signals which implement in a cyclic fashion a suitable set of interconnections for the energy exchange process desired. The switching is however constrained to interact with the energy exchange process in such a way as to provide for preservation as far as possible of stored energy within the purely reactive elements, and to maintain phase coherence between the resulting oscillation and the interrogation waveform.

These objectives are achieved by arranging the switching times so that capacitors are only short circuited at the time at which they have reached zero voltage, and inductors are only open circuited at the time at which they have reached zero current, and by ensuring that the control means 4 will re-open or re-close the switches at the correct instants.

The switching elements in the switching array could be any form of electrical or mechanical switch suitable for the frequency range used which has the characteristics that its interposition between the reactive energy storage elements does not greatly increase the losses involved in the resonance process.

Figure 6:
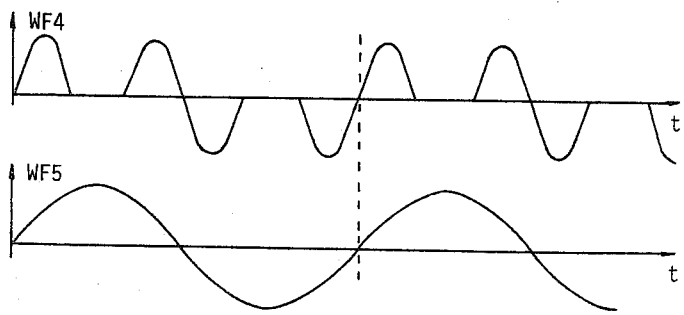
Figure 7:
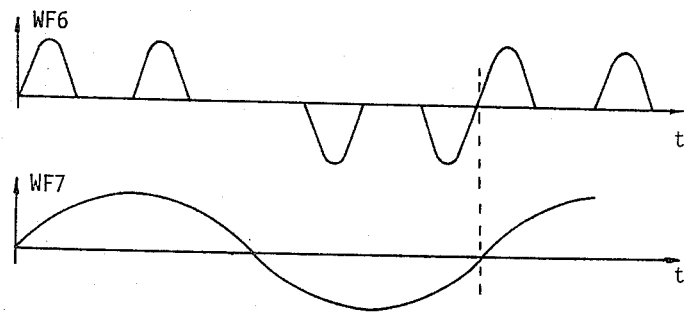

FIGS. 5, 6, and 7 show in conjunction with FIG. 4 the generation of some particular examples of an unlimited number of subharmonic frequencies of a given transmitted signal.

In FIG. 4 direct interconnection of the capacitor and the inductor is signified by a plus (+) sign, crossed interconnection is signified by a minus (−) sign, while a zero indicates that both elements are open circuit.

In FIGS. 5, 6 and 7 WF1 shows the voltage at the transmitter frequency $f_t$ across the transmitter coupling element coil, WF2, WF4 and WF6 show the current in the transponder inductor, and WF3, WF5 and WF7 show the voltage across a receiver coupling element coil tuned to the appropriate subharmonic frequency $f_t/n$.

FIGS. 5, 6 and 7 show respectively the waveforms when switching patterns appropriate to the generation of the subharmonic frequencies $\frac{1}{2}f_t$, $\frac{1}{3}f_t$, $\frac{1}{4}f_t$, are implemented, for example these corresponding to 50 kHz, 33.3 kHz and 25 kHz respectively when the transmitter frequency is 100 kHz. These switching patterns are defined, together with others which generate further subharmonic frequencies, in FIG. 4.

The columns in FIG. 4 show the switching arrangements which are required for successive time intervals of one half period of the transmitter frequency $f_t$. As FIG. 4 indicates, the patterns are to be repeated cyclically.

Figure 8:
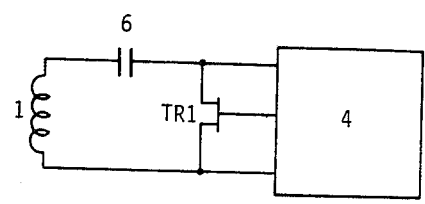
FIG. 8 shows how switching may be effected by a series-connected field-effect transistor, showing also the waveform achieved when interrupting alternate cycles.
Figure 8:
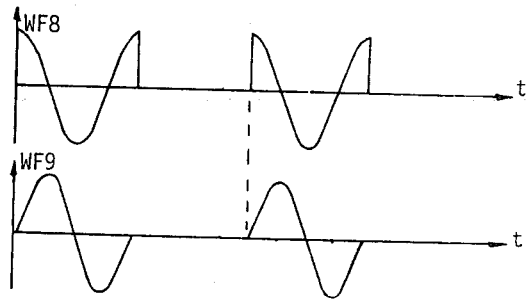

FIG. 8 illustrates one way in which the switching operation required for the generation of subharmonics $\frac{1}{2}f_t$ may be realized by means of a simple series switch which is operated to interrupt alternate cycles of the oscillation at the zeros of the inductor current, the stored energy in the tuned circuit then remaining in the capacitor. The control signals to the switch are also timed to ensure that the oscillation, which resumes with approximately the previous amplitude immediately the switch is reclosed, maintains the same phase relation to the interrogation signal as occurred before the interruption. In this example, the switching is provided by means of a field-effect transistor (FET). The waveforms of inductor voltage and current are shown as WF8 and WF9 respectively.

Figure 9:
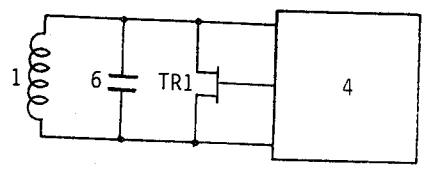
FIG. 9 shows similarly how a parallel-connected field-effect transistor can be used to produce a different waveform.
Figure 9:
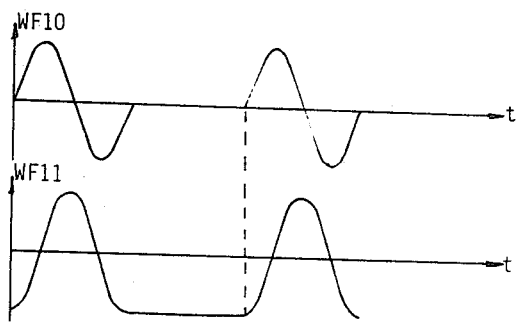

An alternative method of the generation of the same subharmonic frequency is illustrated in FIG. 9 in which a single parallel switch is operated to suspend alternate cycles of the oscillation at the zeros of the capacitor voltage, the stored energy in the tuned circuit then remaining in the inductor. The control signals to the switch are also timed to ensure that the oscillation, which resumes with approximately the previous amplitude immediately the switch is re-opened, maintains the same phase relation to the interrogation signal as occurred before the interruption. The waveforms of inductor voltage and current are shown as WF10 and WF11 respectively. The waveforms shown in the examples of FIGS. 5, 6, 7, 8 and 9 are unmodulated but a wide variety of modulation methods described later in the specification may be used.

Figure 10:
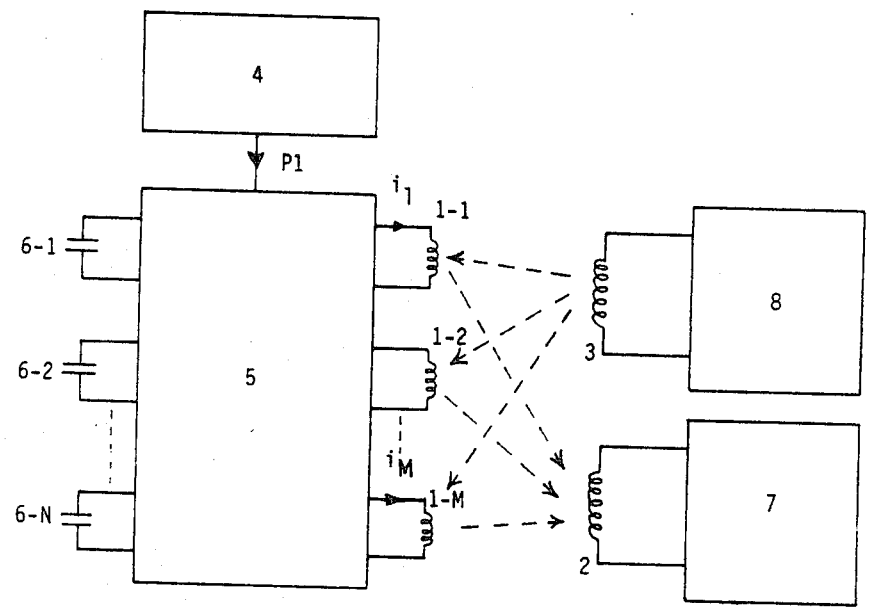
FIG. 10 shows how a single coupling element in the transponder can be replaced by a switched array of coupling elements.

A more general example of the principles of the invention is shown in FIG. 10 in which energy is exchanged in a cyclic fashion between an array of M coupling elements 1-1 to 1-M and an array of N complementary storage elements 6-1 to 6-N via a switching array 5. The switching array provides at any one time for the interconnection of any number of capacitors and any number of coupling elements in series or parallel with any polarity, as well as providing for open or short circuit connection of any of the individual elements, and is operated in such a way that continuity of stored energy across the instants of switching is preserved, and that the necessary phase coherence between the resulting oscillation and the interrogation signal is maintained.

The set of coupling element inductors 1-1 to 1-M which between them provide near-field coupling of the interrogation energy into and the reply signal out from the transponder, are coupled by mutual inductance in varying (including zero) degrees to the transmitter and receiver systems. The sizes of inductors and capacitors and the switching process involved are so adjusted as to provide that at least one of the inductors contains currents with a frequency component at the transmitter frequency, so that the induced voltage in that inductor at the transmitter frequency can produce a net power transfer to the transponder, while at least one coupling element inductor possesses frequency components at substantially different frequencies so that information may be relayed to a receiver which may be tuned to reject signals at the transmitted frequency.

The reply signal from the transponder is designed to carry an information bearing code. Such a code can easily be imposed upon the reply signal by varying the pattern of energy exchange between the reactive energy storage elements so that there is generated either at one time a coded multiplicity of reply signal frequencies, or over a period of time a coded succession of amplitudes, frequencies or phases of the reply signal, while at the same time the characteristics of minimum loss energy exchange between the reactive elements and phase coherent extraction of sufficient energy from the transmitted field to cover the loss in the resonance process are maintained.

Figure 11:
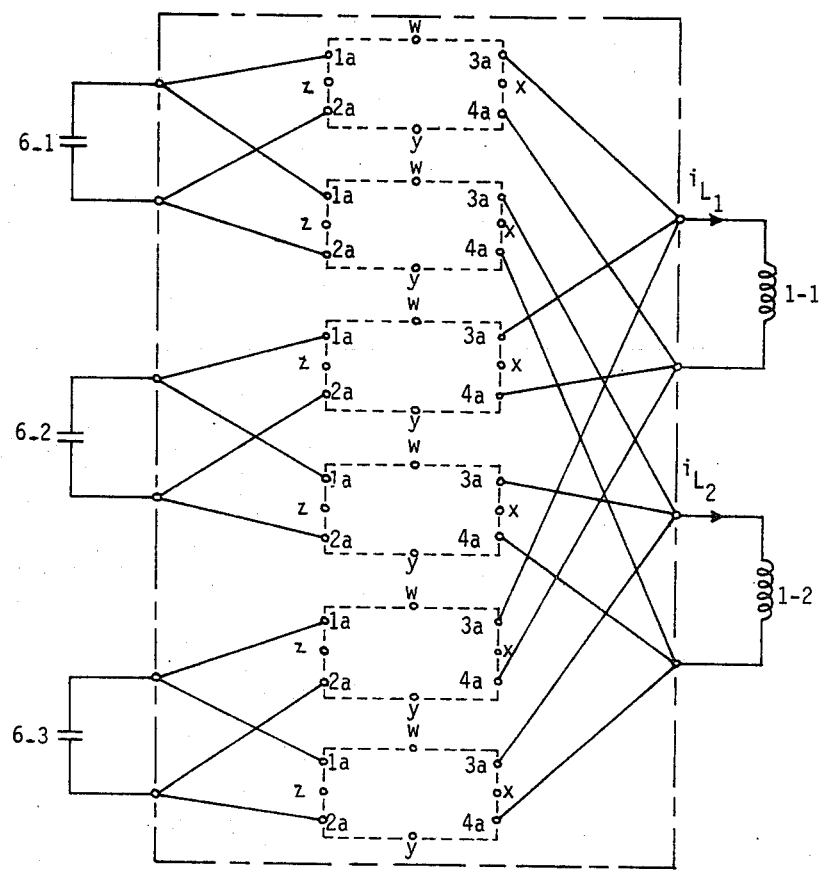
Figure 12:
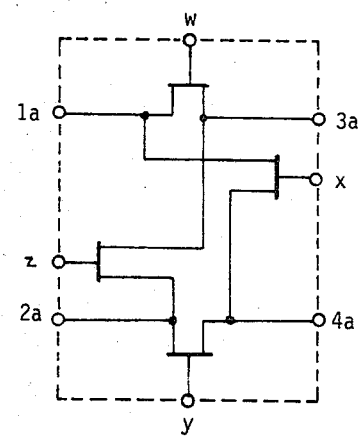

FIG. 11 illustrates one particular realization of the switching array and energy storge elements section of FIG. 10. Here two coupling element inductors 1-1 and 1-2 and three capacitors 6-1, 6-2, and 6-3 are shown. Each of the six switching blocks within FIG. 11 is of the form in FIG. 12. This switching block is realized in this instance from field effect transistors. Appropriate rectangular voltages at control gates w, x, y and z can provide any of the open circuit, short ircuit, direct cross connection or inverted cross connection conditions desired.

Figure 13:
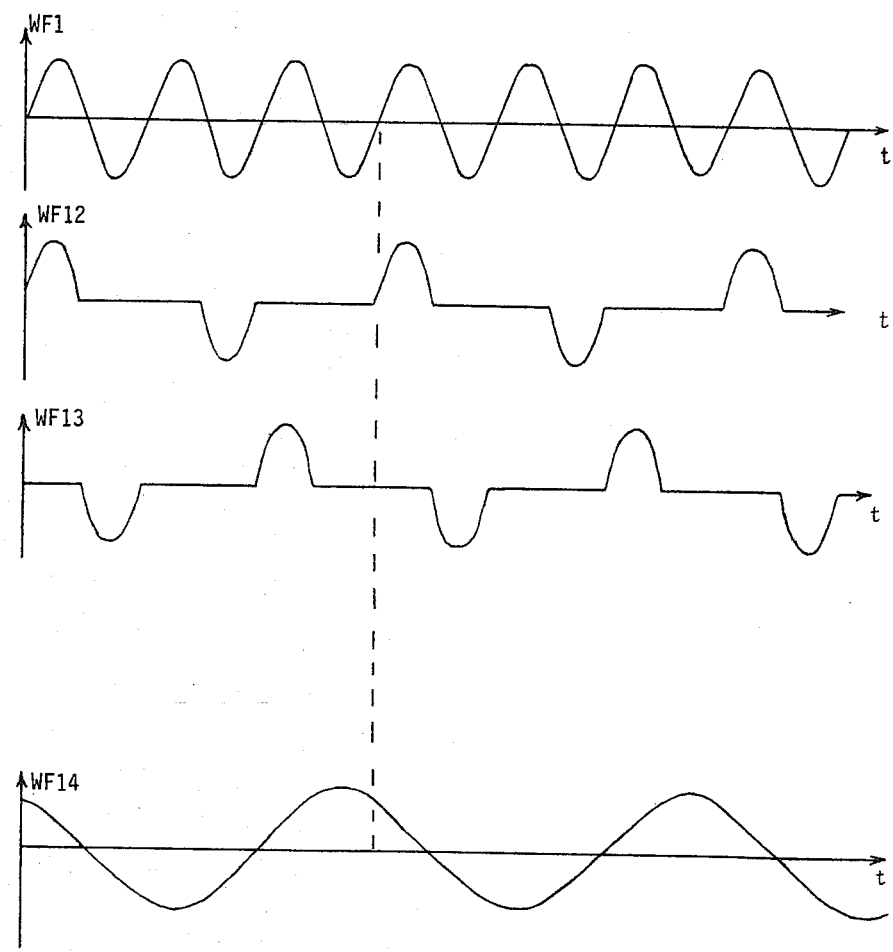

FIG. 13 shows one possible cyclic energy exchange process from an unlimited number which may be realised with the connections of FIG. 11. In this example the basic subharmonic frequency $\frac{1}{3}f_t$ is produced, together with other harmonics $(n/3)f_t$ of the basic subharmonic. The sequence of connections required to produce the indicated waveforms is defined in FIG. 14, in which there is shown for successive time periods equal in length to one half period of the transmitter frequency the connections which are established between each of the capacitors and coupling element inductors. In the table a dash appearing for any time period signifies that the indicated coupling element inductor is left open circuit, while any capacitor not mentioned in any time period is also left open circuit.

Figure 15:
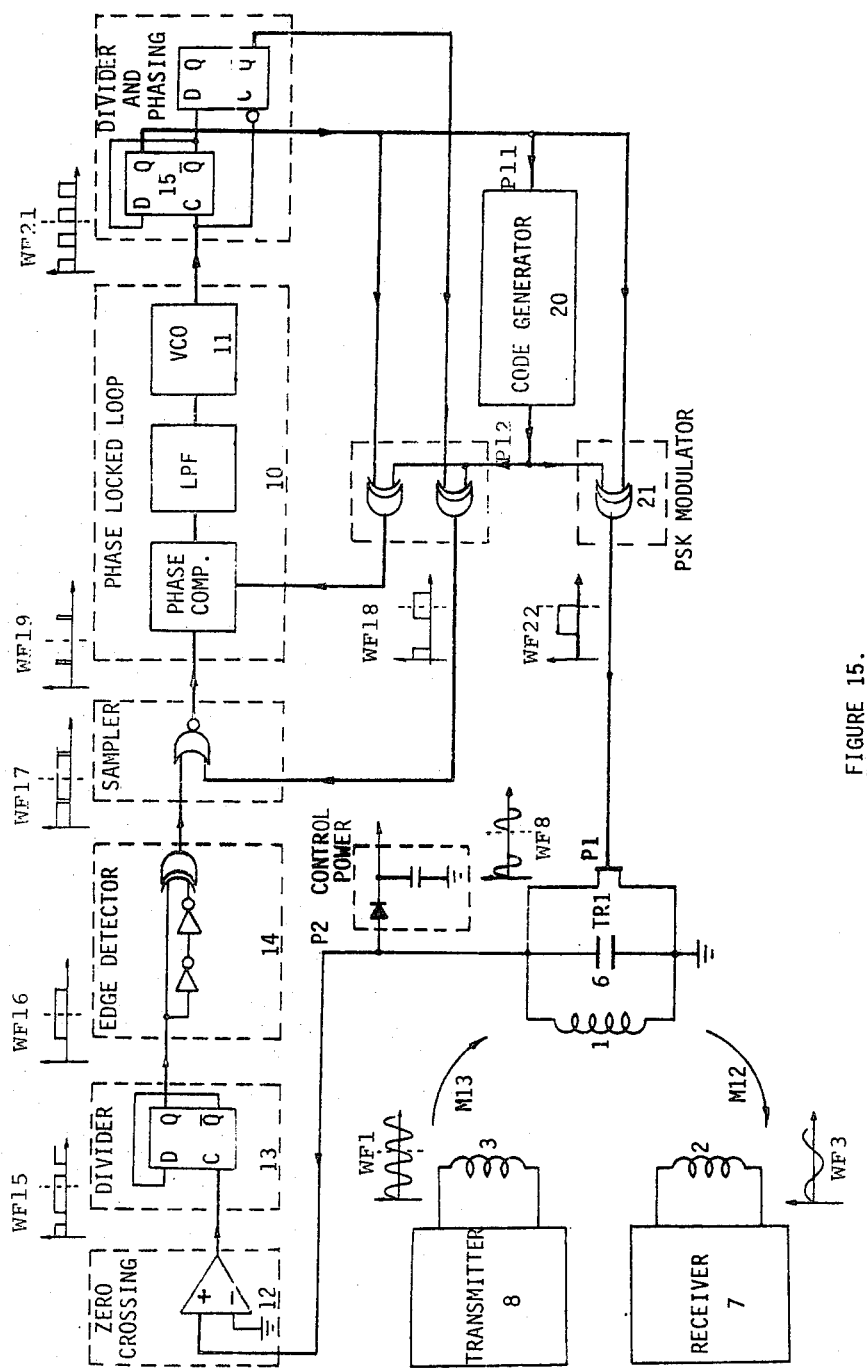
FIGS. 15 and 16 show respectively a circuit diagram for generating an amplitude of phase modulated reply code using a single coil and capacitor, and several waveforms are shown.

FIG. 15 shows one way in which control signals which result in the generation in accord with the above principles of an amplitude or phase modulated reply code at a subharmonic frequency $\frac{1}{2}f_t$ from a transponder employing a single coupling element coil L and energy storage capacitor C can be implemented.

In this particular example the power for energising the control circuit is provided by rectification of the tuned circuit voltage. Provision of the dc power in this way is not however necessary, and even when it is so provided, the essential nature of the invention, namely that the reply signal power is not derived in this way, is preserved.

Figure 16:
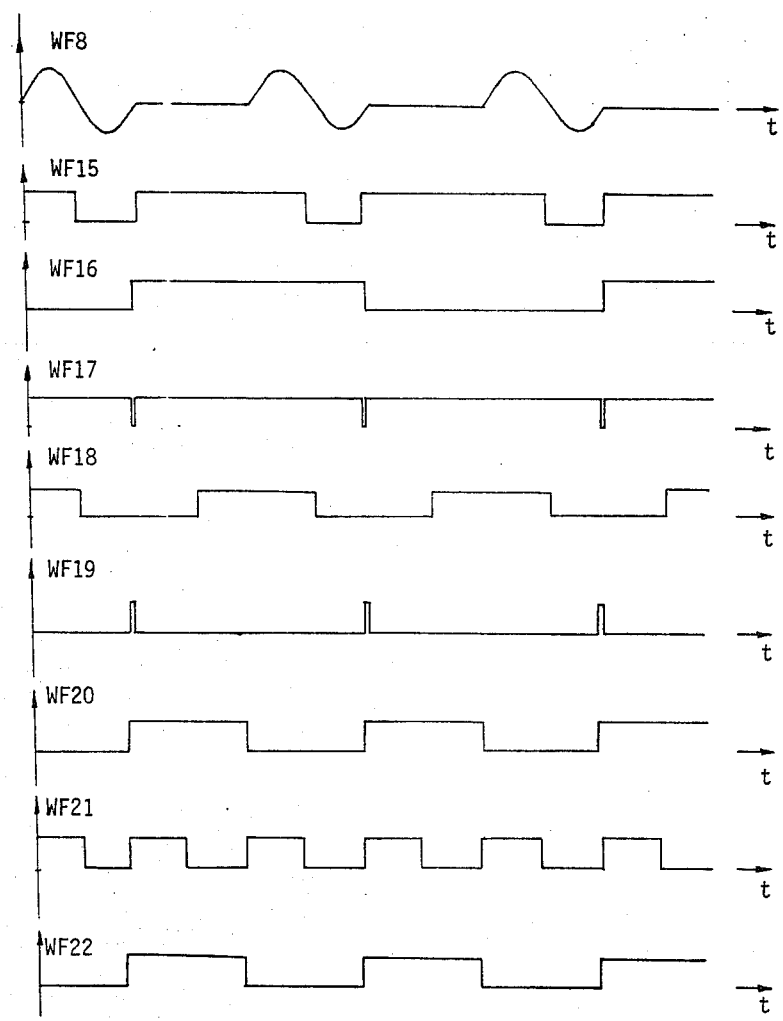

The circuit is best understood by reference to FIG. 16 which shows waveforms produced by the principal sub units of the system.

The basic idea of the circuit is to maintain coherence between a voltage controlled oscillator (VCO) 11, which is tunable over a suitable range in the vicinity of transmitted frequency, and appropriate points of the waveform of the oscillation which is induced in the transponder resonant circuit by the transmitter and which is periodically suspended, with minimum energy loss, by the control circuit.

In this particular circuit the oscillation is first converted to digital form in the zero crossing detector 12 to produce the waveform WF15. The divider 13 and the edge detector 14 circuits produce respectively waveforms WF16 and WF17, the latter consisting of a series of negative pulses marking positive going transitions of the transponder tuned circuit waveform.

In the example to which the waveforms apply, these pulses occur at intervals of twice the interrogation frequency period, as the oscillation has been suspended for alternate cycles. If the tuned circuit switch TR1 were continuously left open, as does occur when some forms of modulation of the reply code are used, the tuned circuit oscillation would proceed uninterrupted and the pulses in the WF17 waveform would occur with a period equal to that of the transmitter signal. Whichever of these two situations applies, pulses of a separation equal to twice the transmitter signal period are produced by gating the waveform WF17 by the phasing waveform WF18 in the sampling circuit to produce a reference pulse train WF19 which occurs at half the frequency of the oscillation. The phasing waveform WF18 is derived in a straight forward manner from the voltage controlled oscillator output WF21.

The function of the reference pulse train WF19 is to control the frequency of the transponder (VCO) 11. This is accomplished by standard phase-locked-loop techniques using a commercially available integrated circuit 10 to which the inputs are WF19 and waveform WF20 fed back from the (VCO) 11 output via the divider 15.

The circuit as outlined above is arranged to suspend oscillation of the transponder resonant circuit during even numbered cycles of the transmitter waveform. This will occur if the output from the code generator block 20, the functions of which will be described later, is a binary "1". If the output of the code generator block is changed to a binary "0", the circuit functions are altered in an obvious way with the result that oscillations of the transponder tuned circuit are permitted during even numbered cycles of the transmitter waveform and suspended during odd numbered cycles. The result of this is that the output signal of the transponder tuned circuit may be PSK modulated in harmony with the output from the code generator. Normally the time allocated to each bit of the serial reply code would correspond to several cycles of the subharmonic frequency $\frac{1}{2}f_t$, for example 8 cycles, but the strength of the reply signal is not influenced by the number of cycles for which a particular phase is maintained.

An elementary modification of the above circuit to produce binary on/off modulation in place of PSK modulation would be to replace the gate 21 within the block marked PSK modulator by a NOR gate to which the code input is inverted. Other obvious modifications to the modulation methods and parameters may be employed.

Figure 17:
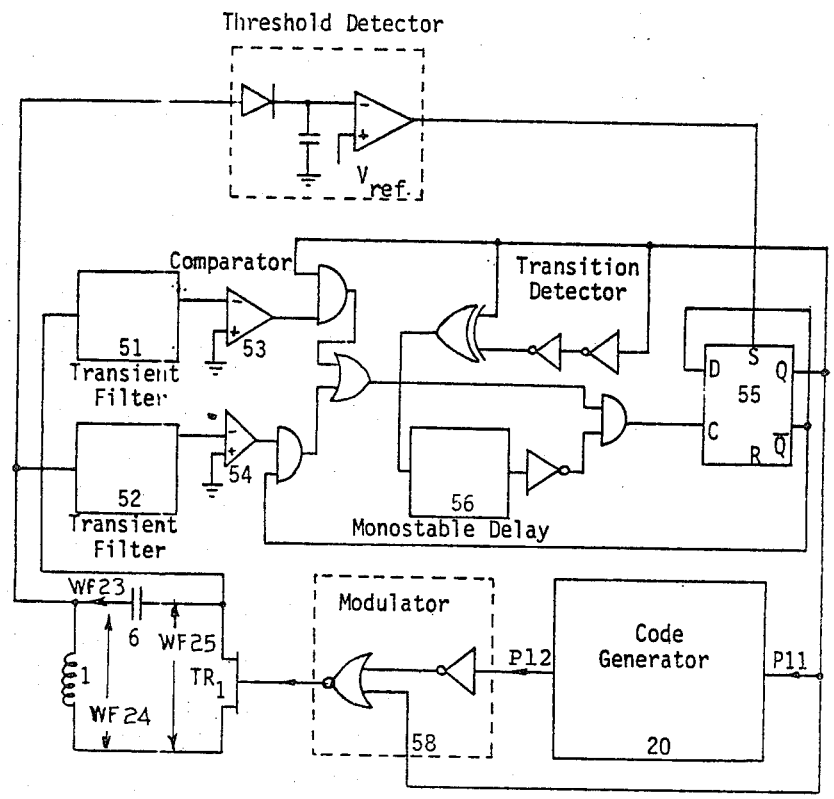
FIGS. 17 and 18 show respectively a circuit for an alternative method of control, and a waveform produced thereby.
Figure 18:
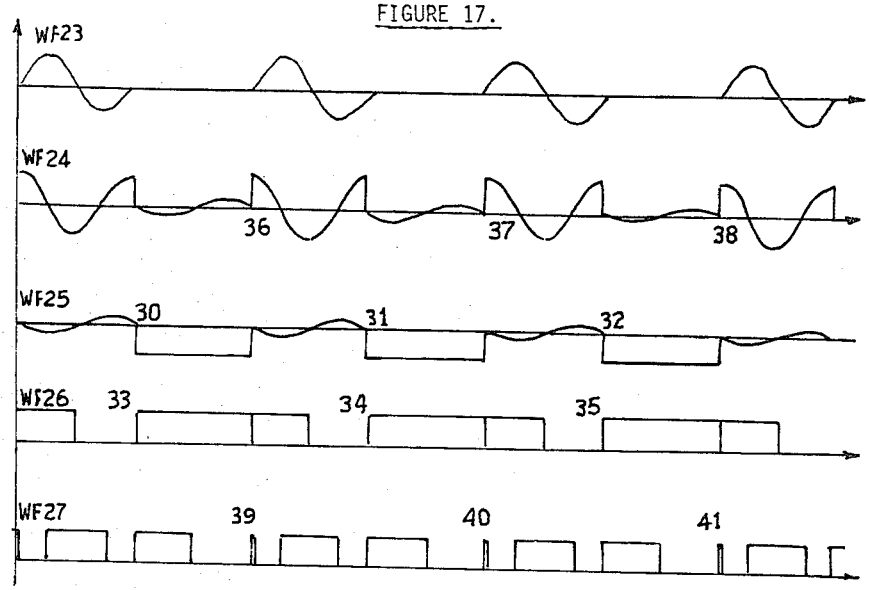

An alternative method of performing the control functions which generate the first subharmonic frequency $\frac{1}{2}f_t$ with a single inductor and capacitor is shown in FIG. 17. In this circuit, by way of illustration, the three elements inductor 1, capacitor 6 and switch TR1 are placed in series. The control circuit monitors both the inductor voltage WF24 and the voltage WF25 across the switch TR1. Both these voltages are shown in the accompanying waveforms of FIG. 18. The function of the control circuit is to determine those points, marked in FIG. 18 by 30, 31, 32, 33, 34 and 35, at which oscillations should be suspended by the opening of the switch TR1, and those points in FIG. 18 marked 36, 37, 38, 39, 40 and 41, at which the switch TR1 is to be reclosed to permit oscillation in phase with the transmitted signal to be resumed.

For the determination of these points the sampled voltages WF24 and WF25 are first filtered by low pass filters 51 and 52, free of high frequency transients which occur upon the opening or closing of the switch TR1 as a result of stray inductances or capacitances in the circuit. The resulting waveforms are then digitized in comparators 53 and 54 to produce the waveforms WF27 and WF26 shown. Selected positive transitions of the two waveforms are used alternately to switch a cycle-select flip-flop 55. This flip-flop 55 controls the operation of the tuned circuit switch TR1 at alternate cycles of the transmitter frequency in a manner which is also affected by the output of the code generator 20; in this particular example the output of the cycle select flip-flop 55 and code generator 20 are combined to produce amplitude modulation rather than phase modulation of the reply signal at the subharmonic frequency $\frac{1}{2}f_t$. The output of the cycle-select flip-flop is also used to activate a monostable timing pulse generator 56 which has the function of inhibiting the clock input to cycle-select flip-flop 55, for a sufficient time after the switch TR1 has been opened or closed, to allow the previously mentioned switching transients to have been effectively attenuated.

In this and other examples of control circuits the design of the code generator is a matter of ordinary skill. A single example of the code generator design will therefore be given later.

Figure 19:
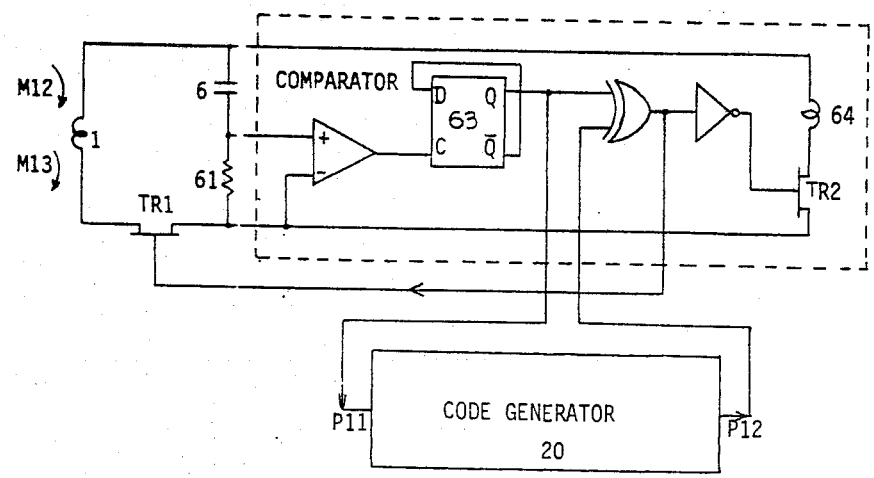
FIG. 19 is a circuit diagram of an alternative form of device for generating the control signal.

In FIG. 19 there is illustrated yet another method of providing control signals in accord with the principles of this invention. Again the objective is produce the subharmonic frequency $\frac{1}{2}f_t$ by suspending oscillation in the transponder tuned circuit on alternate periods of the transmitter waveform.

The tuned circuit is again a series one and the suspension of the oscillation is obtained by opening the switch TR1 at a positive transition of the inductor current waveform. The information for detecting the transition is obtained by inserting in the series resonant circuit a current sampling resistor 61, whose value is small enough to not significantly lower the quality factor of the resonant circuit. The voltage drop across the resistor is monitored in an comparator 62 and used to trigger transitions of a cycle-select flip-flop 63, the output of which when set opens the switch, provided the output of the code generator 20 is a binary one.

The operations just described will suspend the oscillations at the required time.

A second function which the circuit must provide is the resumption of the oscillations one transmitter frequency period later. In this circuit, this function is achieved by providing a second inductor 64 and switch TR2. The switch TR2 is closed as the main switch TR1 is opened with the result that capacitor 6 and the auxiliary inductor 64 execute an auxiliary timing oscillation which bears the required frequency and phase relationship with the interrogating signal. An obvious and useful case results when the value of the inductor 64 equals the value of inductor 1 in which case the auxiliary oscillation is of the same frequency and phase as that occuring within the main tuned circuit. A positive transition of the current in the inductor 64 which current flows also through resistor 61 will again trigger the cycle-select flip-flop 63 and cause a suspension of the auxiliary oscillation and a resumption of the main one.

The operations just described are those which occur when the output of the code generator is a binary one. When the output of the code generator is binary zero, the circuit operation is changed in an obvious way with the result that the time intervals in which the main and auxiliary oscillations occur are interchanged, and the phase of the reply signal is reversed.

So far as the receiver is concerned the generation of the subharmonic reply signal frequency occurs as a result of the auxiliary timing inductor 64 having a coupling to the receiver coupling element coil different from that of the inductor 1. An obvious and simple example results when the auxiliary inductor is uncoupled from both the transmitter and receiver coupling element fields.

Figure 20:
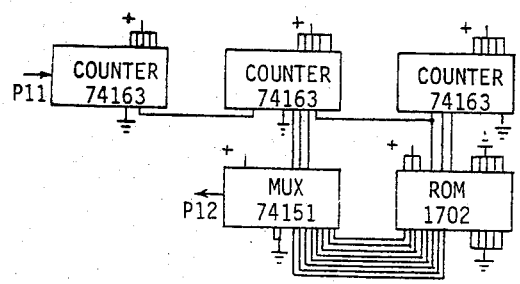
FIG. 20 is a block diagram of a code generator.

One form of code generator which may be employed in conjunction with this invention is illustrated in FIG. 20. This unit consists of a read only memory (ROM) and address selection logic. The input to the code generator at P11 is a pulse train of a frequency which is divided down to provide the appropriate bit rate.

In the example illustrated eight bits of the code are read at a time and are converted in the multiplexer to serial output at the desired rate.

Figure 21:
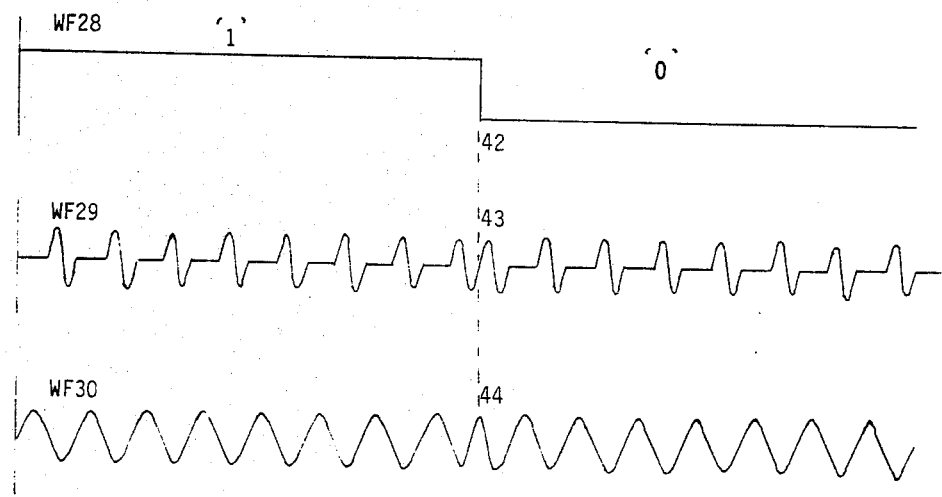
FIG. 21 is a typical waveform of the code therefrom.

The effect of a code on the reply signal is illustrated in FIG. 21. In this example the code waveform WF28 appearing at path P12,PSK modulates the reply signal carrier, which in this case is at half the interrogation frequency. The phase change occurs at the instants of time 42, 43 and 44. The effect of the phase modulation on the current in the transponder inductor is shown in waveform WF29. The waveform WF30 shows the voltage across a receiver antenna element tuned to the reply signal carrier frequency with sufficient bandwidth to pass the phase modulated (PSK) reply signal and at the same time reject the continuous wave interrogation signal.

Figure 22:
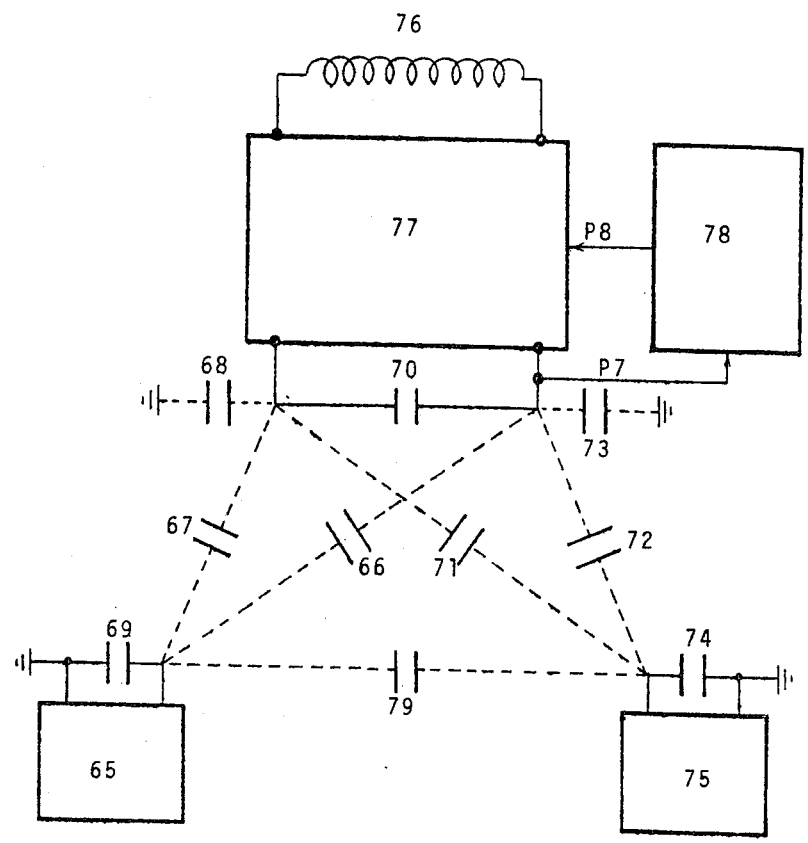
FIG. 22 is a view corresponding to FIG. 1 but showing capacitive coupling, and FIGS. 23 and 24 explain the physical origin of some of the circuit elements of FIG. 22.

FIG. 22 illustrates how the basic elements of the transponder and interrogation system are interconnected in a system which employs capacitive coupling for the interrogation and reply signal paths. In this example energy from the transmitter 65 is fed via mutual capacitances 66 and 67 and ground return capacitance 68 from the transmitter coupling element 69 to the transponder coupling element 70, while energy at the reply frequency is fed via mutual capacitances 71 and 72 and ground return capacitance 73 from the transponder coupling element 70 to the receiver 75, the transmitter 65 and the receiver 75 forming the interrogator. The system may also contain a mutual capacitance 79 which provides an undesired but generally unavoidable coupling directly between the transmitter and receiver of the interrogator. The energy received by the transponder coupling element 70 is exchanged in an oscillatory manner with complementary energy storage element 76 through the switching network 77 operating under control circuit 78 which derives timing signals and possible control power from the transponder element 70 via path P7 and operates the switching network via path P8.

Figure 23:
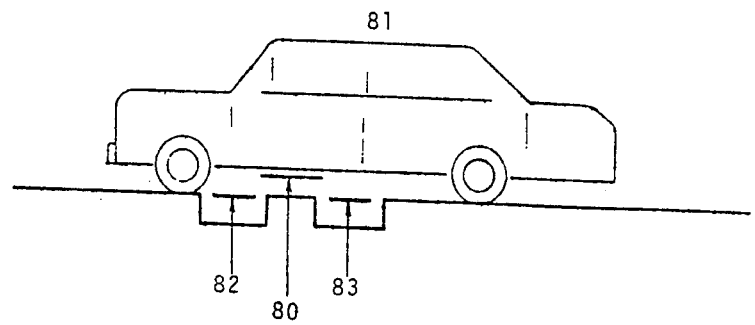
FIG. 23 showing a practical location of the elements.
Figure 24:
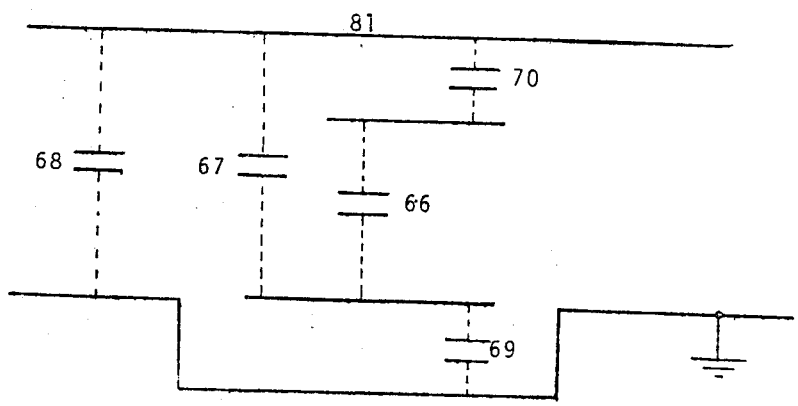

An illustration of an operational situation when capacitive coupling of the type illustrated in abstract form in FIG. 22 is provided in FIGS. 23 and 24. In this application electric near-field coupling is established between a transponder electrode 80 in the form of an insulated metal plate mounted beneath a vehicle 81 and insulated metal plates 82, 83 mounted in dielectric wells in the driveway over which the vehicle passes. In this situation the capacitance 66 and 67 represent the capacitances from the transmitter electrode to the transponder plate and to the vehicle respectively, capacitance 68 represents the large capacitance from the vehicle to ground, while capacitance 69 represents the capacitance of the transmitter electrode to ground. The transponder coupling element capacitance 70 is that between the transponder electrode and the vehicle. Interpretations corresponding to those above for capacitance 66, 67 and 69 can be made for the capacitances 71, 72 and 74 appearing in FIG. 22 in the reply signal path, while capacitance 79 represents the capacitance between the transmitting and receiving electrodes.

In systems employing capacitive near-field coupling, the internal operations within the major system components are similar to those already described for systems employing inductive coupling for the interrogation or reply signal paths.

What is claimed is:

1. An identification system for objects comprising
(A) a transmitter and receiver together forming an interrogator and including an transmitting near-field coupling element and a receiving near-field coupling element,
(B) a transponder having at least one near-field coupling element connected to receive at a first frequency a signal from the said transmitting near-field coupling element and to transmit at a second frequency a reply to the said receiving near-field coupling element,
(C) means within the transponder to form at least one resonant circuit containing the transponder coupling element and associated complementary energy storage element,
(D) means within the transponder for the generation of a reply code, characterised in that there are
(E) control and switching means within the transponder for regulating with minimum energy loss the pattern of energy exchange between the transponder coupling element and the associated complementary energy storage element whereby at least subharmonics of the interrogation frequency are generated as a reply signal within the transponder coupling element, and means for further varying also with minimum energy loss the pattern of energy exchange between the transponder coupling element and its complementary energy storage element so that an information bearing reply is generated in the said reply signal.

2. A system for identification of objects comprising a transmitting means having at least one near-field coupling element for generation of an interrogation signal at a first frequency, and a remote transponder comprising
electromagnetic coupling means containing at least one near-field coupling element for reception of the interrogation signal and establishing a reply signal field at a second frequency
reactive energy storage means to provide resonance with the coupling element and enhancement of the power transfer across the electromagnetic path
switching means placed between the coupling element and tuning elements to regulate the flow of stored energy between those elements so that the resulting oscillation contains a subharmonic of the first frequency, thereby providing a reply signal carrier at the said second frequency
control means connected to operate said switching means at times which preserve stored energy in the reactive elements and which maintain synchronism with the interrogation signal
and coding means synchronised with the oscillation in the said coupling and tuning elements and connected to the said control means to vary the pattern of energy exchanges between the said elements so that the said reply carrier becomes modulated with an information bearing code at rates unrelated to transponder tuned circuit bandwidth without reduction in reply signal level
and receiving means containing at least one near-field coupling element and means for demodulating said reply signal.

3. A system for the remote identification of objects by means of transmitting by near-field electromagnetic coupling an interrogation signal to a transponder, in which the exchange of energy between a near-field coupling element and a tuning element is regulated by switching means placed between these elements and in which the coupling element current and voltage waveforms contain simultaneously components at the interrogation frequency and a subharmonic thereof, the subharmonic frequency providing a reply carrier signal, the switching means operating at instances of time at which loss of stored energy in the resonant circuit comprising said coupling and tuning elements is minimised and which maintain phase coherence between the interrogation signal and the resulting coupling element waveform, and in which a code generator synchronised with the waveform of oscillation in the near-field coupling element is used to further vary the pattern of energy exchange between the coupling and tuning elements to modulate the said subharmonic reply carrier with an information bearing signal.

4. An object identification system as in claim 3 in which the said second frequency is a multiple of a subharmonic of the said first frequency but is not an integer multiple of the said first frequency.

5. An object identification system as in claim 4 wherein the said transponder contains means for detection of instants of time at which alteration of the interconnections between the reactive energy storage elements may be effected with minimum energy loss, and means to effect switching at the detected instants of time.

6. An object identification system as in claim 5 wherein to provide preservation of stored energy the said alteration of interconnection between reactive energy storage elements is effected at zeros of inductor current.

7. An object identification system as in claim 6 wherein the energy exchange process between the transponder near-field coupling element and its complementary energy storage element is regulated by a switch connected in series with the said complementary energy storage element.

8. An object identification system as in claim 5 wherein to provide preservation of stored energy the said alteration of interconnection between reactive energy storage elements is effected at zeros of capacitor voltage.

9. An object identification system as in claim 8 wherein the energy exchange process between the transponder near-field coupling element and its complementary energy storage element is regulated by a switch connected in parallel with the said complementary energy storage element.

10. An object identification system as in claim 5 wherein the said transponder contains means for detection of instants of time at which oscillations which are suspended may be resumed in synchronism with the interrogation signal.

11. An object identification system as in claim 10 wherein the said detection is provided by means of a phase-locked-loop synchronised at selected intervals to the coupling element waveform.

12. An object identification system as in claim 10 wherein the said detection is provided by an electronic circuit which samples during the suspended oscillation the interrogation signal.

13. An object identification system as in claim 10 wherein the said detection is provided by means of an auxiliary oscillation of a period related to that of the interrogation signal.

14. An object identification system according to claim 1 in which a plurality of near-field coupling elements are used in the transponder and in which energy is exchanged in a cyclic fashion between the said coupling element and a set of reactive energy storage elements via a switching array so that a subharmonic of the interrogation signal is generated within at least one of the said transponder coupling elements.

15. An object identification system as in claim 14 wherein an information bearing code is imposed upon the reply signal either simultaneously or in time sequence.

16. An object identification system according to claim 15 wherein the said code is an amplitude modulated code, the rate of information transfer being not limited by the bandwidth of the transponder resonant circuit.

17. An object identification system as in claim 15 wherein the said code is a phase modulated code, the rate of information transfer being not limited by the bandwidth of the transponder resonant circuit.

18. An object identification system as in claim 15 wherein the said code is imposed upon the reply signal by means of the simultaneous generation of a plurality of reply frequencies.

19. An object identification system as in claim 15 wherein the said code is imposed upon the reply signal by means of the successive generation of a sequence of reply frequencies.

20. An object identification system as in claim 14 wherein part of the energy received at the said first frequency in the said transponder is rectified and stored to assist in actuating the said control and switching means.

* * * * *